Sept. 28, 1926.  
J. B. HENDERSON  
OPTICAL INSTRUMENT  
Filed June 23, 1920
1,601,390
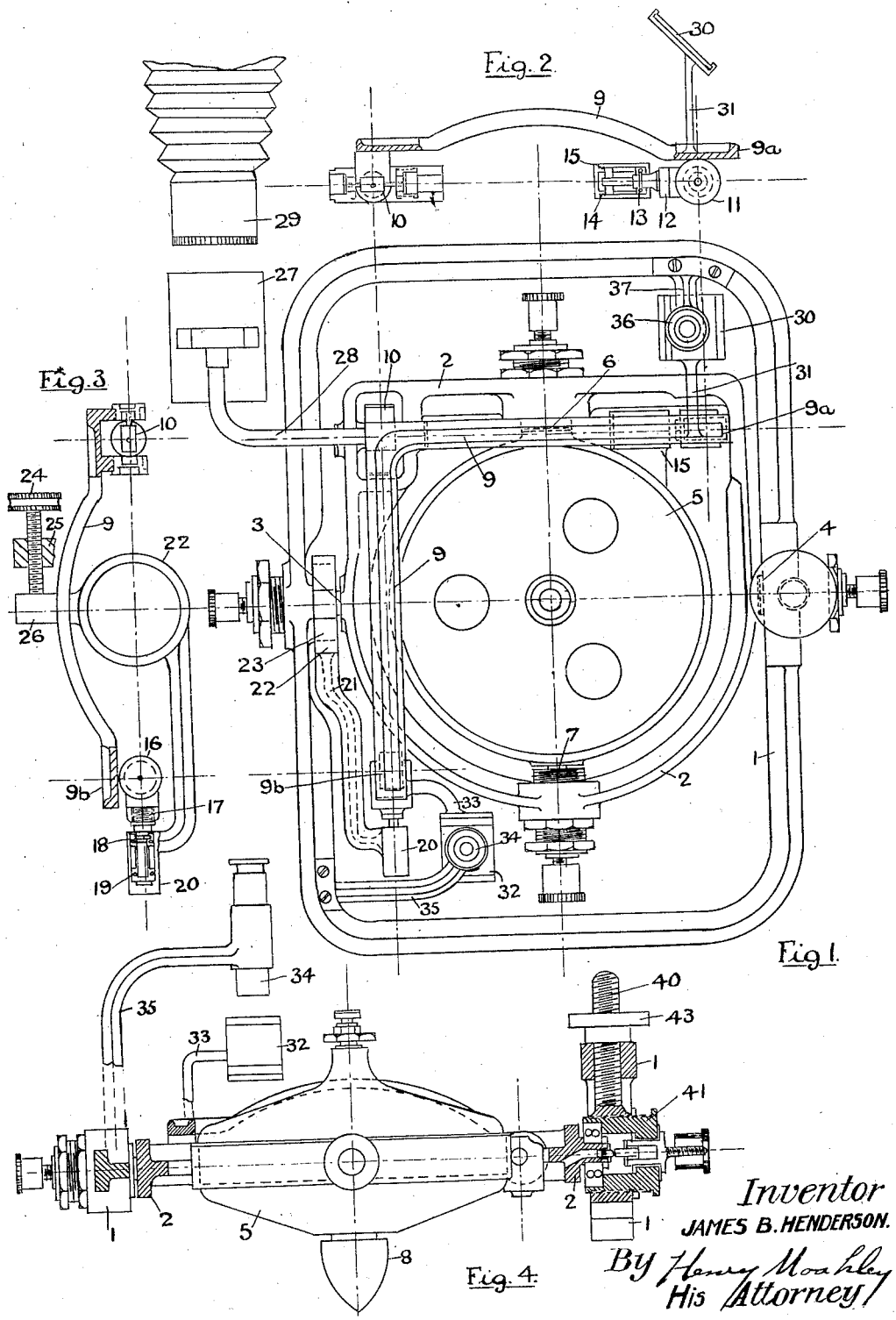

Patented Sept. 28, 1926.

1,601,390

UNITED STATES PATENT OFFICE.

JAMES BLACKLOCK HENDERSON, OF LEE, ENGLAND.

OPTICAL INSTRUMENT.

Application filed June 23, 1920, Serial No. 391,189, and in Great Britain September 22, 1919.

My invention relates to improvements in optical instruments for use on oscillating platforms such as aeroplanes, airships, seacraft and the like, and more especially to providing gyroscopic means for stabilizing the field of view of the instrument so as to make it independent of the angular motion of the platform In the following description of my invention I shall describe its application for use with a camera on board an aeroplane for photographing the ground below the plane for use in surveying or other purposes, so that the camera may be rigidly fixed to the air-craft and yet may photograph a place vertically below, irrespective of the banking and pitching of the aeroplane.

Fig. 1 shows a plan of the instrument,

Figs. 2 and 3 show sectional views at right angles of the mirror carrier,

Fig. 4 shows a central section and also illustrates a method of adjustment and the position of one of the telescopes used for adjustment.

In Fig. 1 the base plate or frame 1 is rigidly fixed to the aeroplane or oscillating platform upon which it is mounted. The frame 1 carries a gimbal ring 2 upon trunnions 3 and 4. The gimbal ring carries the gyroscope 5 upon horizontal trunnions 6 and 7, the trunnion axis 6—7 being at right anges to the trunnion axis 3—4. The gyroscope has a small gravity control due to the weight 8 (Fig. 4).

The gimbal ring 2 also carries the L-shaped frame or tripod 9, the corner of the L being universally pivoted on the gimbal ring 2 by the Hooke's joint 10 (Figs. 1, 2 and 3). The end 9ª of the L rests upon a roller 11 (Fig. 2) which is pivoted in a fork 12 which is pivoted on ball bearings 13 and 14 in the housing 15 which is rigidly attached to the gyro case. The end 9ᵇ of the L rests upon a similar roller 16 (Fig. 3) pivoted in a fork 17 which is pivoted on ball bearings 18 and 19 in a housing 20 carried upon a crank 21. This crank is normally fixed to the frame 1 but is adjustable relatively to it. The crank is attached to a sleeve 22 which turns upon a cylindrical boss 23 on the frame 1 coaxial with the trunnion 3. The crank is adjusted by a screw 24 turning in a lug 25 which is attached to the frame 1, the point of the screw bearing upon a lug 26 attached to the sleeve 22 (Fig. 3). The centre of the universal joint 10 and the centre of the roller 11 are equidistant from the trunnion axis 6—7 and the centre of the universal joint 10 and the centre of the roller 16 are equidistant from the trunnion axis 3—4.

The tripod 9 carries the miror 27 upon a bracket 28 the mirror being preferably inclined at 45° to the horizontal. The camera lens 29 is placed near the mirror 27 with its axis of collimation horizontal when the platform is horizontal, the camera being fixed to the platform. The mirror 27 is made of optically worked glass both faces being plane and the two faces parallel within a wave-length of light.

The tripod also carries a mirror 30 upon a bracket 31 which is inclined at 45° to the horizontal so as to provide a view of the horizon in the direction of the trunnion axis 3—4 to an observer looking vertically downwards into the mirror. It carries similarly the mirror 32 upon a bracket 33 giving an image of the horizon in the direction of the trunnion axis 6—7, in the field of view of a small telescope 34 (Fig. 4) which is mounted upon a bracket 35 rigidly attached to the frame 1. A similar telescope 36 is similarly mounted over the mirror 30 upon a bracket 37. The telescopes 34 and 36 are provided with cross wires and are for the purpose of correcting any small precession of the gyroscope.

The adjustments for correcting the precession of the gyroscope consist of the screw 24 already mentioned and a screw 40 (Fig. 4) which is attached to the housing 41 of the bearing 42 which carries the trunnion 4 of the gimbal ring 2. The housing 41 can be raised or lowered in the frame 1 by turning the nut 43.

Assuming the apparatus to have been erected upon an aeroplane with the gyroscope running and arranged so that an image of the ground below is viewed by the camera in the mirror 27, the image of the landscape formed upon the photographic plate or ground glass screen will be found to keep its position on the plate or screen irrespective of any rolling or pitching of the aeroplane. This is due to the fact that when the camera which is mounted upon the aeroplane becomes inclined to the vertical in any plane, the mirror 27 will be turned in the same plane through half the angle through which the camera is turned because each arm of the frame or tripod 9 to which the mirror is attached is twice the length of the crank arm by which it is actuated from the gyroscope. The deviation of the image of the ground on the plate of the camera is thus corrected. Under these conditions the mirror 27 may be said to be semi-stabilized, and this term whenever used herein will be understood to have this meaning. The image will move relatively to the plate or screens due to the speed of the aeroplane and also due to any slow precession of the gyroscope.

I compensate the effects of this slow precession by the adjustments 24 and 43. The observer looks from time to time through the small telescopes 34 and 36 and adjusts the cross wires upon the image of the horizon or upon any other distant object. I employ those adjustments more particularly when carrying out a photographic survey of a country by air-craft, photographs of the country being taken at equal intervals of time, which are then viewed stereoscopically to draw the contour lines. In such an application of my invention it is essential that the gyroscopic axis shall not precess relatively to the vertical during the whole run of exposures or that this precession shall be completely compensated as described.

I may employ my system of level control on the gyroscope described in my British Patent No. 9062/17 to keep the rotor axis vertical and damp the precession, instead of the direct gravity control.

Although I have described and illustrated my invention in its application to photography from aircraft it is to be understood that it is equally applicable to any sighting device mounted upon an oscillating platform.

The camera takes a photograph of the landscape inverted only in one plane, but for stereoscopic working the negative can be viewed through the glass. If it is necessary to eliminate this defect in any particular case I may employ two mirrors and photograph the image formed by double reflection only one of the mirrors being semi-stabilized as described above, the other being fixed to the platform.

The two adjusting telescopes are shown on the drawings some distance apart. I may arrange them conveniently to be used simultaneously by two eyes of the observer or I may combine the two fields of view in one eyepiece.

Having now particularly described and ascertained the nature of my said invention and in what manner the same is to be performed, I declare that what I claim is:—

1. An optical instrument for use on an angularly movable platform comprising a frame, an optical part mounted on the frame, a stabilizing device free from forced oscillations in phase with the disturbing forces introduced by oscillations of the platform, and means operatively associating said device and frame for semi-stabilizing the frame in a plurality of directions.

2. An optical instrument for use on an angularly movable platform, comprising a passively mounted frame, an optical part mounted on the frame, a stabilizing device free from forced oscillations in phase with the disturbing forces introduced by oscillations of the platform, and mechanism operatively associating said device and frame to oscillate the same in two planes through an angle equal to one half of the angle of oscillation of the platform.

3. An optical instrument for use on an angularly movable platform, comprising a movably mounted frame, a stabilizing device free from forced oscillations in phase with the disturbing forces introduced by oscillations of the platform, and actuating means operatively associating said device and frame, responsive to relative movement of the platform and said device and communicating such movement to said frame in a definite proportion in two planes.

4. An optical instrument for use on an angularly movable platform, comprising a displaceably mounted frame, a reflector mounted thereon, a stabilizing device free from forced oscillations in phase with the disturbing forces introduced by oscillations of the platform, said device being operatively associated with said frame to semi-stabilize the same in two planes.

5. An optical instrument for use on an angularly movable platform, comprising a frame movable in a plurality of directions, an optical part mounted on said frame, a gyroscope, and means connecting the gyroscope with the frame to semi-stabilize the frame in a plurality of directions.

6. In apparatus of the character described, an observation instrument mounted on a body subject to angular variation of position, an optical part adapted to co-operate with said instrument, a movably member carrying said optical part, stabilizing means free from forced oscillations in phase with the disturbing forces introduced by oscillations of the body, and means operatively associating said stabilizing means and member whereby relative motion between the body and stabilizing means is communicated to said optical part in a definite proportion in two planes.

7. In apparatus of the character described, an observation instrument mounted on a body subject to angular variation of position, a reflector adjustably mounted to co-operate with said instrument, and stabilizing means free from forced oscillations in phase with the disturbing forces introduced by oscillations of the body, said stabilizing means being operatively associated with said adjustably mounted reflector whereby relative movement between said body and means is communicated to the reflector in a definite proportion in more than one plane.

8. An optical instrument for use on an angularly movable platform, including a part provided with a surface for reflecting rays of light emanating from a distant object, a gyroscope, and operable mechanism under the joint control of the platform and said gyroscope for regulating said reflecting part to compensate for the effect of movement of the platform in two planes upon the image of the object in the field of view of the instrument.

9. An optical instrument for use on an angularly movable platform, comprising an optical system having an adjustable reflector, a gyroscope, and movement-proportioning mechanism operatively connected to said reflector and having a part responsive to the platform and another part provided with a stabilized connection to said gyroscope to thereby move said reflector one half the angular movement of the platform in two planes.

10. An optical instrument for use on an angularly movable platform, comprising a frame, an optical part mounted on the frame, a gyroscope, mechanism co-acting with said gyroscope and frame to semi-stabilize said optical part in two planes, and means associated with the frame for compensating for straying of the gyroscope in both planes.

11. An optical instrument for use on an angularly movable platform, comprising a member adapted to be attached to the platform, a second member movably mounted within the first member, a gyroscope mounted within the second member, a frame operatively associated with the first and second members and to the gyroscope, and an optical part mounted on the frame.

12. An optical instrument for use on an angularly movable platform, comprising a member adapted to be attached to the platform, a second member movably mounted within the first member, a gyroscope mounted within the second member, a tripod member operatively associated at one point with the first member at another point with the second member and at a third point with the gyroscope, and an optical part mounted on the frame.

13. An optical instrument for use on an angularly movable platform, comprising a member adapted to be attached to the platform, a second member movably mounted within the first member, a gyroscope mounted within the second member, an L-shaped frame operatively associated at one end with the first member, at its corner with the second member and at its other end with the gyroscope, and an optical part mounted on the frame.

14. Apparatus for semi-stabilizing a part of an instrument adapted for use on an angularly movable platform, comprising a member adapted to be attached to the platform, a second member movably mounted within the first member, a gyroscope mounted within the second member, and a frame carrying the part to be semi-stabilized and operatively associated with the first and second members and with the gyroscope.

15. Apparatus for semi-stabilizing a part of an instrument adapted for use on an angularly movable platform, comprising a member adapted to be attached to the platform, a second member movably mounted within the first member, a gyroscope mounted within the second member, a frame and means whereby the frame may be tilted to compensate for straying of the gyroscope without causing the gyroscope to precess.

16. An optical instrument for use on an angularly movable platform, comprising a member adapted to be attached to the platform, a second member movably mounted within the first member, a gyroscope mounted within a second member, an L-shaped frame operatively associated at one end with the first member, at its corner with the second member and at its other end with the gyroscope, a mirror mounted on the frame at its corner, and mirrors mounted on the frame at its ends.

17. An optical instrument adapted for use upon an angularly moving platform, comprising a plurality of optical parts, a member carrying some of said optical parts and partaking of the angular movement of the platform, a gyroscope, and mechanism responsive to said member and gyroscope for semi-stabilizing the remaining optical parts in two planes to compensate for the effect of angular movement of the platform.

18. An optical instrument adapted for use upon an angularly moving platform, comprising a plurality of optical parts for viewing an object, a member carrying some of said optical parts and partaking of the angular movement of the platform, a gyroscope, and means associated with said gyroscope controlling the remaining optical parts causing the image of the object to remain in fixed relation to a predetermined point of the field of view irrespective of the angular movement of the platform in two planes.

19. An optical instrument for use on an angularly moving platform, comprising a frame, an optical part mounted on the frame, a gyroscope, mechanism co-acting with said gyroscope and frame to semi-stabilize said optical part in two planes, and means for detecting straying of the gyroscope in both planes.

20. An optical instrument for use on an angularly moving platform, comprising a frame, an optical part mounted on the frame, a gyroscope, mechanism co-acting with said gyroscope and frame to semi-stabilize said optical part in two planes, means for detecting straying of the gyroscope in both planes, and means associated with the frame for compensating for straying of the gyroscope in both planes.

JAMES BLACKLOCK HENDERSON.